United States Patent
Sakamoto et al.

(10) Patent No.: US 11,173,922 B2
(45) Date of Patent: Nov. 16, 2021

(54) VEHICLE CONTROL DEVICE AND VEHICLE CONTROL SYSTEM

(71) Applicant: Hitachi Automotive Systems, Ltd., Hitachinaka (JP)

(72) Inventors: Hideyuki Sakamoto, Hitachinaka (JP); Tatsuya Horiguchi, Tokyo (JP); Takeshi Yamakawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 98 days.

(21) Appl. No.: 16/619,716

(22) PCT Filed: Mar. 29, 2018

(86) PCT No.: PCT/JP2018/013121
§ 371 (c)(1),
(2) Date: Dec. 5, 2019

(87) PCT Pub. No.: WO2018/225352
PCT Pub. Date: Dec. 13, 2018

(65) Prior Publication Data
US 2020/0139982 A1 May 7, 2020

(30) Foreign Application Priority Data

Jun. 5, 2017 (JP) .............................. JP2017-111172

(51) Int. Cl.
*B60W 50/02* (2012.01)
*B60W 30/18* (2012.01)
(Continued)

(52) U.S. Cl.
CPC ........ *B60W 50/0205* (2013.01); *B60W 30/18* (2013.01); *B60W 50/0225* (2013.01);
(Continued)

(58) Field of Classification Search
CPC ............. B60W 50/0205; B60W 30/18; B60W 50/0225; B60W 2050/022;
(Continued)

(56) References Cited

U.S. PATENT DOCUMENTS 5,987,365 A * 11/1999 Okamoto .............. F02D 41/266
701/34.3
6,230,094 B1 * 5/2001 Ohashi .................... F02D 41/22
123/396
(Continued)

FOREIGN PATENT DOCUMENTS

JP 61049154 * 3/1986
JP S61-49154 A 3/1986
(Continued)

OTHER PUBLICATIONS

International Search Report with English translation and Written Opinion issued in corresponding application No. PCT/JP2018/013121 dated Jun. 5, 2018.

*Primary Examiner* — Jonathan M Dager
*Assistant Examiner* — Jean W Charleston
(74) *Attorney, Agent, or Firm* — Foley & Lardner LLP (57) ABSTRACT

Achieved is a vehicle control device capable of performing seamless automatic driving control even when an operation abnormality occurs in an operation processing unit in a vehicle control device, and improving safety.
When operation processing of an actuator control command is performed by two microcomputers of microcomputers 11b and 12b in synchronization, and a monitoring circuit 11m detects an abnormality of the microcomputer 11b, a communication circuit 11c that communicates the actuator control command of the microcomputer 11b to a brake control unit 13 or the like is latched in a disabled state, and the actuator control command from an icon 12b is transmitted to the brake control unit 13 or the like via the communication (Continued)

circuit 12c. The disabled state of the communication circuit 11c is maintained until an IGNSW or an automatic driving SW of the vehicle toggles, and until that time, the actuator control command from the microcomputer 12b is transmitted to the brake control unit 13 or the like. The control moves from the microcomputer 11b to the microcomputer 12b to the microcomputer 11b, so that it is possible to suppress the occurrence of the control gap at every control transition of multiple times, and it is possible to maintain the seamless automatic driving control.

15 Claims, 5 Drawing Sheets

(51) Int. Cl.
  *G05B 9/02* (2006.01)
  *G05D 1/00* (2006.01)
(52) U.S. Cl.
  CPC .......... *G05B 9/02* (2013.01); *B60W 2050/022* (2013.01); *G05D 1/0088* (2013.01)
(58) Field of Classification Search
  CPC . B60W 2050/021; B60W 50/023; G05B 9/02; G05B 9/03; G05D 1/0088; G06F 11/18
  USPC .......................................................... 701/23
  See application file for complete search history.

(56) References Cited

U.S. PATENT DOCUMENTS

| | | | |
|---|---|---|---|
| 6,356,821 B1* | 3/2002 | Yoshida | G05B 9/02 123/333 |
| 2009/0198407 A1* | 8/2009 | Sakai | B60W 50/0205 701/29.1 |
| 2015/0210232 A1* | 7/2015 | Kanzaki | H02H 7/18 701/36 |
| 2018/0178831 A1* | 6/2018 | Toko | H02P 27/04 |
| 2018/0178835 A1* | 6/2018 | Toko | B62D 5/0493 |
| 2018/0257662 A1* | 9/2018 | Ishigooka | G06F 11/0793 |
| 2019/0300009 A1* | 10/2019 | Sakamoto | B60W 50/0225 |

FOREIGN PATENT DOCUMENTS

| | | | |
|---|---|---|---|
| JP | H05- 99061 A | | 4/1993 |
| JP | 2009-184423 A | | 8/2009 |
| JP | 2012-205313 A | | 10/2012 |
| JP | 2012205313 | * | 11/2012 |
| JP | 2013-025570 A | | 2/2013 |
| JP | 2013-89104 A | | 5/2013 |
| JP | 2015-072569 A | | 4/2015 |
| JP | 2016-076049 A | | 5/2016 |
| JP | 2017-081290 A | | 5/2017 |
| WO | WO-2017/073415 A1 | | 5/2017 |

\* cited by examiner

| LATCH CIRCUIT 1 | | COMMUNICATION CIRCUIT 1 |
|---|---|---|
| INPUT | OUTPUT | |
| 11t | 11q | 11c |
| High | High (LATCH) | DISABLE |
| High→Low | | |
| Low | Low | ENABLE |

STATE OF LATCH CIRCUIT 1 INPUT AND
OUTPUT AND COMMUNICATION CIRCUIT 1

VEHICLE CONTROL DEVICE AND VEHICLE CONTROL SYSTEM

TECHNICAL FIELD

The present invention relates to a vehicle control device and a vehicle control system of an automatic driving system.

BACKGROUND ART

In an electronic control unit (ECU), which is a higher-level control device that controls automatic driving, in order to realize an advanced automatic driving system, for example, even in a case where a fault occurs in an operation processing device (microcomputer) that performs operation for automatic driving control, it is required to continue operation for a certain period of time before driving operation is transferred to a driver.

In order to realize the above-mentioned operation continuation for a certain period, multiplexing of the control system and redundancy using operation monitoring can be considered.

PTL 1 discloses a control device that is made redundant using a main system microcomputer and a sub system microcomputer, and in the control device, diagnosis is performed on a plurality of modules provided in the main system, and when diagnosed abnormality is severe, the sub system microcomputer is operated by stopping all modules of the main system microcomputer.

CITATION LIST

Patent Literature

PTL 1: JP 2016-76049 A

SUMMARY OF INVENTION

Technical Problem

An automatic driving system includes, for example, a vehicle control device that outputs a control command, and a plurality of actuator control devices that perform each of engine control, brake control, power steering control, and the like on the basis of the control command from the vehicle control device.

Here, in the automatic driving system, from the viewpoint of functional safety, it is desired to monitor operation of a microcomputer by a diagnosis circuit, such as a watchdog timer that monitors program runaway in the microcomputer, and perform fail processing by detecting an abnormality of the microcomputer. However, when processing such as stopping (resetting) the microcomputer uniformly in response to an abnormality in the microcomputer is performed, the function of the automatic driving system will be stopped.

However, when the function of the automatic driving system suddenly stops, a vehicle occupant needs to take over the driving of the vehicle, but since the time for the vehicle occupant to take over the driving occurs, control interpolation by the vehicle system is necessary, and technology for that is required.

As a means for solving the above problem, as described in PTL 1, as a redundant configuration using a main system microcomputer and a sub system microcomputer, control of stopping the main system microcomputer and operating the sub system microcomputer when an abnormality is detected in the main system microcomputer can be considered.

However, when there is a difference between the control command values of the main system microcomputer and the sub system microcomputer, the control gap generated at the time of control transition is a problem. For example, when a temporary abnormality occurs in the main system microcomputer, control is moved to the sub system microcomputer, and then the main system microcomputer recovers from the abnormality, the control moves from the main system microcomputer to the sub system microcomputer to the main system microcomputer, and it is conceivable that a control gap may occur at each of multiple control transitions.

The occurrence of the control gap causes a problem that seamless automatic driving control becomes difficult.

The present invention has been made in view of the above problems, and an object thereof is to achieve a vehicle control device and a vehicle control system capable of performing seamless automatic driving control even when an operation abnormality occurs in an operation processing unit in a vehicle control device, and improving safety.

Solution to Problem

The present invention is configured as follows for solving the aforementioned problems.

A vehicle control device includes: a first control command generation unit that generates an actuator control command to be transmitted to an actuator control unit of a vehicle; a second control command generation unit that generates an actuator control command to be transmitted to the actuator control unit; and a communication circuit for transmitting the actuator control command generated by the first control command generation unit and the actuator control command generated by the second control command generation unit to the actuator control unit, in which, when an abnormality occurs in the first control command generation unit, the communication circuit is latched in a disabled state so as to cut off transmission of the actuator control command generated by the first control command generation unit to the actuator control unit.

A vehicle control system includes: an outside recognition sensor that recognizes the outside of a vehicle; an automatic driving setting unit that sets automatic driving of the vehicle; an actuator control unit that controls operation of the vehicle; a vehicle control device that generates an actuator control command for commanding the operation of the vehicle on the basis of outside recognition information from the outside recognition sensor and track information generated by a track information generation unit, and transmits the actuator control command to the actuator control unit, in which the vehicle control device includes a first control command generation unit that generates an actuator control command to be transmitted to an actuator control unit, a second control command generation unit that generates an actuator control command to be transmitted to the actuator control unit, and a communication circuit for transmitting the actuator control command generated by the first control command generation unit and the actuator control command generated by the second control command generation unit to the actuator control unit, and when an abnormality occurs in the first control command generation unit, the communication circuit is latched in a disabled state so as to cut off transmission of the actuator control command generated by the first control command generation unit to the actuator control unit.

Advantageous Effects of Invention

According to the present invention, a vehicle control device and a vehicle control system capable of performing seamless automatic driving control even when an operation abnormality occurs in an operation processing unit in a vehicle control device, and improving safety can be achieved.

DESCRIPTION OF EMBODIMENTS

Embodiments of the present invention will be described below with reference to the attached drawings.

EXAMPLES (Example of Configuration of Automatic Driving System)

First, the configuration of an automatic driving system (vehicle control system) to which the present invention is applied will be described.

Figure 1:
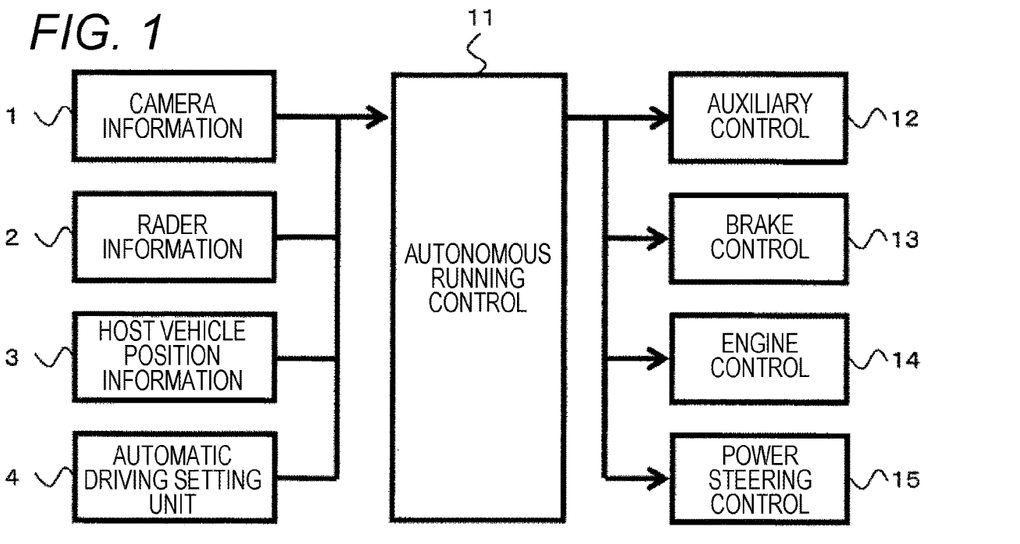
FIG. 1 is a schematic configuration diagram of an automatic driving system provided in a vehicle to which the present invention is applied.

FIG. 1 is a schematic configuration diagram of an automatic driving system provided in a vehicle to which the present invention is applied. In FIG. 1, the automatic driving system includes a camera (first sensor) 1, a radar (second sensor) 2, and a host vehicle position sensor (third sensor) 3 that are outside recognition sensors for recognizing the situation of the outside of the vehicle, and an automatic driving setting unit 4 for setting automatic driving.

Moreover, the automatic driving system includes an autonomous running control unit (first ECU) 11 (vehicle control device), an auxiliary control unit (second ECU) 12, a brake control unit (third ECU) 13, an engine control unit (fourth ECU) 14, and a power steering control unit (fifth ECU) 15. Note that the brake control unit 13, the engine control unit 14, and the power steering control unit 15 can be collectively referred to as an actuator control unit that controls the operation of the vehicle.

The camera 1, the radar 2, the host vehicle position sensor 3, the autonomous running control unit 11, the auxiliary control unit 12, the brake control unit 13, the engine control unit 14, and the power steering control unit 15, are connected so as to be able to communicate with each other by an on-vehicle network (for example, the controller area network (CAN), the Ethernet (registered trademark) or the like).

The auxiliary control unit 12 is a control device that monitors the transmission state of the autonomous running control unit 11 and operates to execute appropriate degeneration control as a backup when the autonomous running control unit 11 fails, but if the safety can be secured by providing the degeneration control function in the autonomous running control unit 11 even when the autonomous running control unit 11 fails, the degeneration control is unnecessary.

The brake control unit 13 is a control device that performs brake control (braking force control) of the vehicle, and the engine control unit 14 is a control device that controls an engine that generates a driving force of the vehicle. Furthermore, the power steering control unit 15 is a control device that controls power steering of the vehicle.

The host vehicle position sensor 3 is a device that acquires the position of a host vehicle using radio waves from positioning satellites such as the global positioning system (GPS). The host vehicle position sensor 3 outputs the acquired host vehicle position information to the autonomous running control unit 11. Note that the host vehicle position sensor 3 may acquire host vehicle position information using a positioning system other than the GPS.

Furthermore, the host vehicle position sensor 3 has a memory for storing map data used in automatic driving in the inside of the host vehicle position sensor 3, and map data such as road width, number of lanes, slope, curvature of curve, shape of intersection, or speed limit information is stored. Note that the map data may be stored inside the autonomous running control unit 11.

The automatic driving setting unit 4 is a device for setting a destination, a route, a running speed and the like during automatic driving. The automatic driving setting unit 4 has an input device (not shown) for a passenger to make settings. This input device corresponds to, for example, a start switch for a passenger to start the automatic driving system, a physical input device such as a button or a touch panel, a gesture input device using a camera or infrared light, or a voice input device. The automatic driving setting unit 4 outputs information input by the passenger via the input device to the automatic running control unit 11.

Here, when the autonomous running control unit 11 receives a request for automatic driving from the automatic driving setting unit 4, a track along which the vehicle moves is calculated on the basis of information of the outside such as the camera 1, radar 2 or the host vehicle position sensor 3, and the autonomous running control unit 11 outputs control commands such as a brake and a driving force to the brake control unit 13, the engine control unit 14, and the power steering control unit 15 so as to move the vehicle along the route described above.

The brake control unit 13, the engine control unit 14, and the power steering control unit 15 receive a control command for automatic running control from the autonomous running control unit 11, and output an operation signal to each control target (actuator).

First Embodiment

Figure 2:
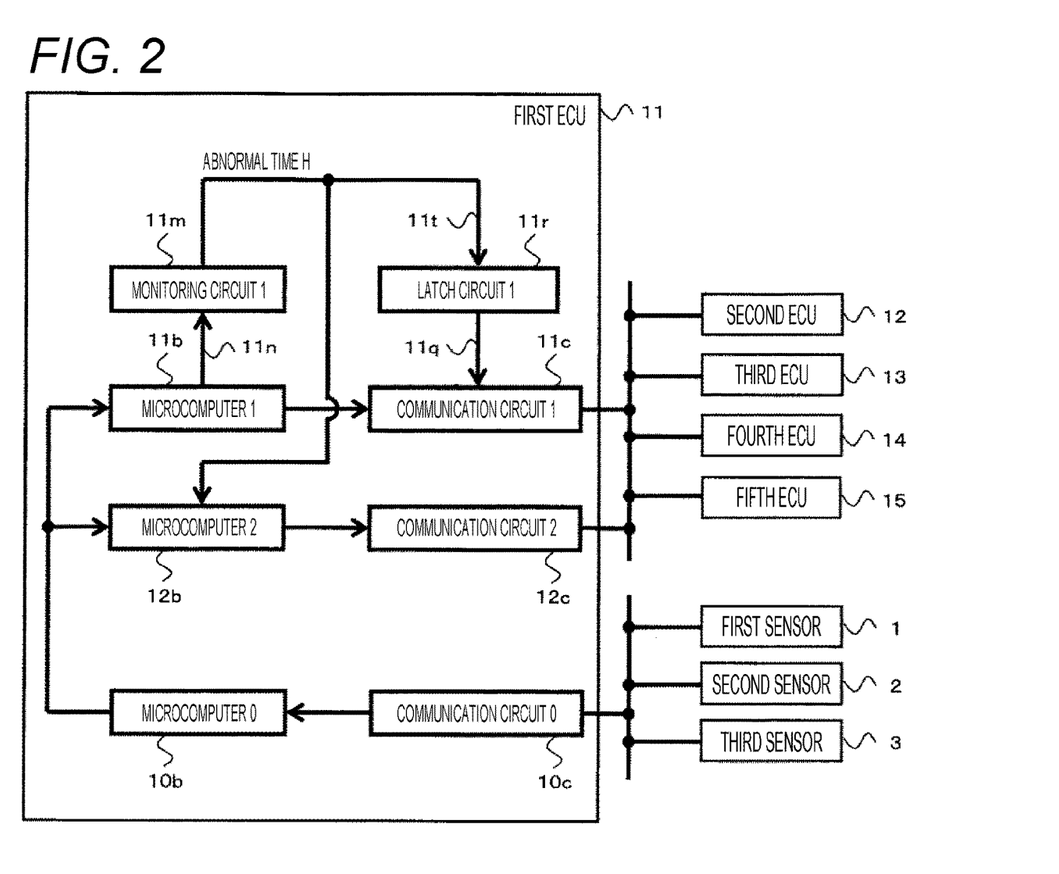
FIG. 2 is a diagram showing an internal configuration of an autonomous running control unit (first ECU) in a first embodiment of the present invention.

FIG. 2 is a diagram showing an internal configuration of an autonomous running control unit (first ECU) 11 in a first embodiment of the present invention.

In FIG. 2, an example is shown in which a monitoring circuit (monitoring circuit 11m) outside the microcomputer detects an abnormality in the operation of a first control microcomputer (microcomputer 11b) in the control device, and after detecting the abnormality, the communication circuit 11c on the first control microcomputer 11b side is latched in a disabled state.

Here, the microcomputer 11b is defined as a first control command generation unit that generates a control command, and the microcomputer 12b is defined as a second control command generation unit that generates a control command.

The microcomputer 11b and the microcomputer 12b are microcomputers supplied with power from separate power supplies, respectively.

In FIG. 2, the autonomous running control unit 11, which is a running control device for automatic driving, has three microcomputers: a microcomputer 10b, a microcomputer 11b, and a microcomputer 12b, and includes a communication circuit 10c (communication circuit 0), a communication circuit 11c (communication circuit 1 (first communication circuit)), and a communication circuit 12c (communication circuit 2 (second communication circuit)) corresponding to the respective microcomputers 10b, 11b and 12b.

In FIG. 2, although the autonomous running control unit 11 has three microcomputers: the microcomputer 10b, the microcomputer 11b, and the microcomputer 12b, for example, the microcomputer 10b and the microcomputer 11b may be disposed in the autonomous running control unit 11, and the microcomputer 12b may be disposed in a control unit other than the autonomous running control unit 11. Note that the microcomputer 11b and the microcomputer 12b may be provided in the inside of the autonomous running control unit 11, and the microcomputer 10b may be disposed in a control unit other than the autonomous running control unit 11. Moreover, the microcomputer 10b alone may be disposed outside the autonomous running control unit 11.

Sensor information (outside recognition information) is transmitted to the microcomputer 10b (microcomputer 0) from the camera 1 (first sensor), the radar 2 (second sensor), and the host vehicle position sensor 3 (third sensor), which are outside sensors, via the communication circuit 10c. The microcomputer 10b recognizes the situation of the outside on the basis of the transmitted sensor information, and generates information of the track along which the host vehicle moves. Therefore, the microcomputer 10b can be defined as a track information generation unit.

The microcomputer 10b transmits the generated track information to the microcomputer 11b (microcomputer 1) and the microcomputer 12b (microcomputer 2). Each of the microcomputers 11b and 12b receives the information of the outside recognition sensor such as a wheel speed sensor, an acceleration sensor, and a yaw rate sensor (not shown) (these pieces of information are also included in the outside recognition information) from the external ECU (control device) via the communication circuit 11c (communication circuit 1) and the communication circuit 12c (communication circuit 2), generates an actuator control command for each, and on the basis of the information and track information operated by the microcomputer 10b, transmits the actuator control command to the brake control unit 13 (third ECU), the engine control unit 14 (fourth ECU), and the power steering control unit 15 (fifth ECU).

Here, the microcomputer 11b and the microcomputer 12b have a synchronization unit (not shown) for synchronizing processing timing. When the track information from the microcomputer 10b is input to the microcomputers 11b and 12b, this timing is taken as a synchronization signal, each of the microcomputer 11b and the microcomputer 12b starts operation processing of a control command to the actuator, and the processing timings of the microcomputer 11b and the microcomputer 12b are synchronized with each other.

A monitoring circuit 11m (monitoring circuit 1) that monitors the microcomputer 11b is connected to the microcomputer 11b, and a program run signal 11n is output from the microcomputer 11b to the monitoring circuit 11m. The monitoring circuit 11m has a watchdog timer (not shown) that monitors the runaway of the microcomputer 11b.

Here, the monitoring circuit for monitoring the microcomputer 11b may be 11m, and may be a circuit incorporated in the microcomputer 11b.

When the monitoring circuit 11m detects an abnormality in the microcomputer 11b, an abnormal signal lit is transmitted to the latch circuit 11r (latch circuit 1 (first latch circuit)) connected to the output of the monitoring circuit 11m and the microcomputer 12b.

When notified of the abnormality of the microcomputer 11b, the latch circuit 11r transmits a signal 11q to the communication circuit 11c and latches the communication circuit 11c in a disabled state. As a result, when the microcomputer 11b is abnormal, the actuator control command to the brake control unit 13, the engine control unit 14, and the power steering control unit 15 of the microcomputer 11b is cut off, and the cut off state is maintained.

The actuator control command is always transmitted from the microcomputer 11b and the microcomputer 12b, and when the microcomputer 11b is abnormal, only the actuator control command of the microcomputer 11b may be cut off.

Furthermore, as another method, a method may be applied in which, when the system is started, the actuator control command is output only from the microcomputer 11b, and when the microcomputer 11b is abnormal, the microcomputer 12b cuts off the actuator control command of the microcomputer 11b and at the same time, the microcomputer 12b receives the abnormal signal lit, so that an actuator control command is output from the microcomputer 12b.

In this way, the actuator control command of the microcomputer 11b is shifted to the actuator control command of the microcomputer 12b. However, in consideration of the control gap at the control shift, it is desirable that the same control software be mounted on the microcomputer 11b and the microcomputer 12b.

As described above, the microcomputer 11b and the communication circuit 11c, and the microcomputer 12b and the communication circuit 12c are in a relationship in which control is transferred at the time of abnormality, and the power supply circuits (not shown) that supply power to each need to be independent from each other in order to eliminate the common cause failure.

Figure 3:
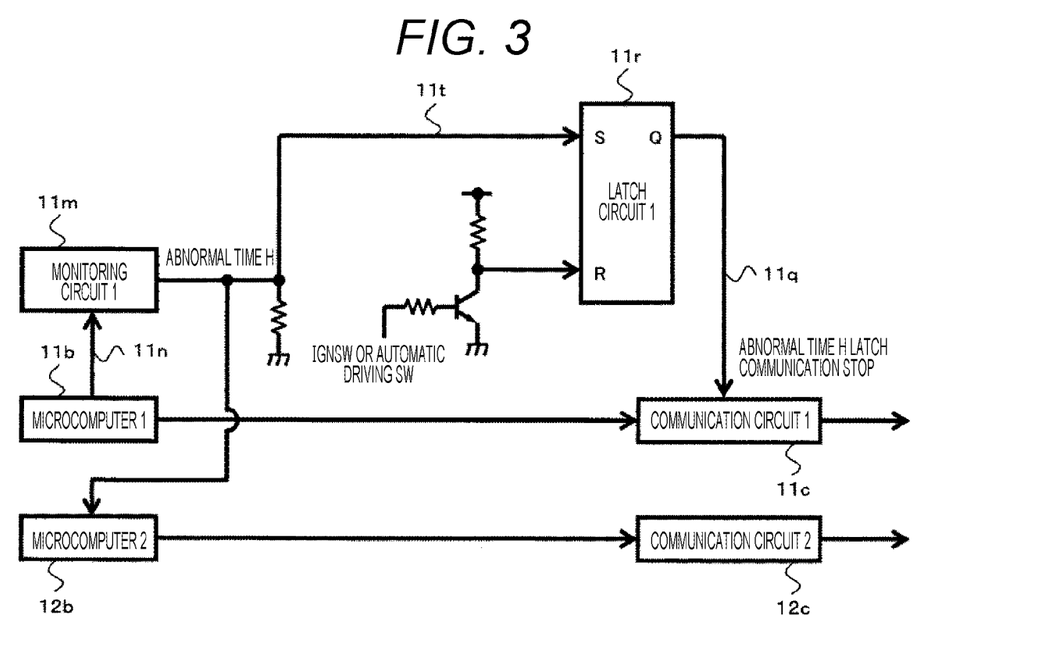
FIG. 3 is a diagram showing details of a latch circuit in the first embodiment of the present invention.

FIG. 3 is a diagram showing details of a latch circuit in the first embodiment of the present invention.

In FIG. 3, an SR flip flop is used for the latch circuit 11r, and an abnormal signal lit output when the microcomputer 11b is abnormal is output to the S terminal, and an IGNSW signal (ignition signal) of the vehicle or an automatic driving SW signal (automatic driving switch signal) transmitted from the automatic driving setting unit 4 is output to the R terminal.

When the monitoring circuit him detects an abnormality in the microcomputer 11b, the microcomputer abnormal signal lit changes from low to high, and a signal 11q (high) is output from the latch circuit 11r. The latch circuit 11r and the communication circuit 11c are connected by a signal line, and when the signal 11q becomes High, the communication circuit 11c is disabled. The disable mentioned here may be setting of stopping the function of the communication circuit, but may be a setting of making the function dedicated only for receiving (only the transmission of the communication circuit 11c is stopped) in consideration of the interference to the communication bus connected.

Furthermore, even when the abnormality of the microcomputer 11b is temporary and the microcomputer 11b is recovered from the abnormality by the reset of the microcomputer 11b and the microcomputer abnormal signal lit from the monitoring circuit 11m becomes from high to low, unless the IGNSW signal or the automatic driving SW signal of the vehicle connected to the R terminal of the latch circuit 11r is toggled, the High output of the signal 11q is held, and the disabled state of the communication circuit 11c continues.

As a result, once the monitoring circuit him detects an abnormality of the microcomputer 11b, the actuator control command of the microcomputer 11b is cut off until the IGNSW or the automatic driving SW of the vehicle toggles. Even when the microcomputer 11b is recovered to normal by reset or the like, the internal control value of the microcomputer 11b immediately after the recovery is returned to the default value. Therefore, when the actuator control command of the microcomputer 11b is output, a control gap may be generated as a vehicle system. Therefore, it is possible to prevent the occurrence of the control gap by interrupting the actuator control command of the microcomputer 11b.

As described above, according to the first embodiment of the present invention, when the two microcomputers of the microcomputers 11b and 12b execute the operation processing of the actuator control command in synchronization and the abnormality of the microcomputer 11b is detected by the monitoring circuit 11m, the communication circuit 11c that communicates the actuator control command of the microcomputer 11b to the brake control unit 13 or the like is latched in a disabled state, the actuator control command from the microcomputer 12b is transmitted to the brake control unit 13 or the like via the communication circuit 12c, the disabled state of the communication circuit 11c is maintained until the IGNSW or the automatic driving SW of the vehicle toggles, and until that time, the actuator control command from the microcomputer 12b is transmitted to the brake control unit 13 or the like.

Therefore, the control moves from the microcomputer 11b to the microcomputer 12b to the microcomputer 11b, it is possible to suppress the occurrence of the control gap at every control transition of multiple times, and it is possible to maintain the seamless automatic driving control. When the input state of the IGNSW or the automatic driving SW of the vehicle is toggled (switched) is a case where the vehicle driving stop state is switched to the driving start or manual driving is switched to automatic driving, so that since the control gap never occurs in the automatic driving state, it is possible to release the above latch state.

That is, according to the first embodiment of the present invention, as an effect, seamless automatic driving control can be performed even when an operation abnormality occurs in an operation processing unit in a vehicle control device, and a vehicle control device and a vehicle control system capable of improving safety can be achieved.

Second Embodiment

Next, a second embodiment of the present invention will be described.

Figure 4:
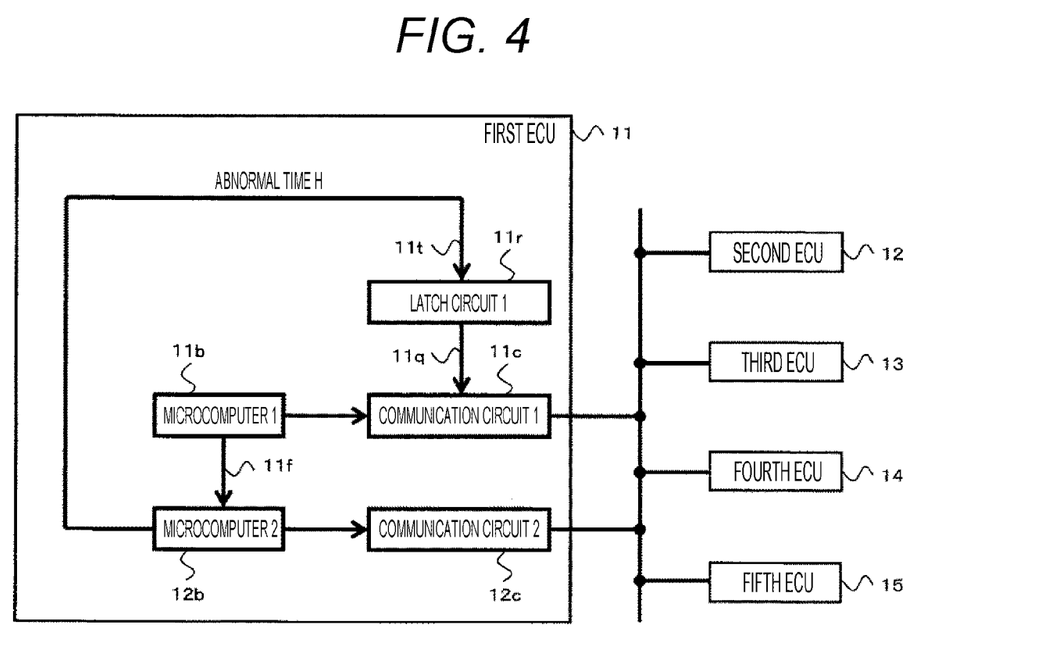
FIG. 4 is a diagram showing an internal configuration of an autonomous running control unit (first ECU) in a second embodiment of the present invention.

The second embodiment is an example in which the operation of the first control microcomputer (microcomputer 11b) in the vehicle control device 11 is monitored by the second control microcomputer (microcomputer 12b), and after the abnormality of the first control microcomputer (microcomputer 11b) is detected, the communication circuit (communication circuit 11c) on the first control microcomputer side is latched in a disabled state.

FIG. 4 is a diagram showing an internal configuration of an autonomous running control unit (first ECU) 11 in the second embodiment.

Although the microcomputer 10b and the outside sensor are not shown in FIG. 4, the microcomputer 10b and the outside sensor are also disposed and connected as in FIG. 2, and the microcomputer 10b transmits the track information generated on the basis of the information from the outside sensor to the microcomputer 11b and the microcomputer 12b.

The microcomputer 11b generates an actuator control command on the basis of the track information from the microcomputer 10b, and transmits the actuator control command to the brake control unit 13, the engine control unit 14, and the power steering control unit 15 via the communication circuit 11c, and also transmits the actuator control command to the microcomputer 12b via a communication line 11f to determine the normality of the microcomputer 11b.

As similar to the microcomputer 11b, the microcomputer 12b generates an actuator control command on the basis of the track information from the microcomputer 10b. However, the microcomputer 12b compares the actuator control command generated by the microcomputer 12b with the actuator control command received from the microcomputer 11b to detect whether an abnormality has occurred in the microcomputer 11b.

When the microcomputer 12b detects an abnormality in the microcomputer 11b, the abnormal signal lit is output to the latch circuit 11r connected to the microcomputer 12b. When notified of the abnormality of the microcomputer 11b, the latch circuit 11r outputs a signal 11q to the communication circuit 11c and latches the communication circuit 11c in a disabled state. As a result, when the microcomputer 11b is abnormal, the actuator control command of the microcomputer 11b is cut off.

The latch circuit 11r in the second embodiment has the similar configuration to the example shown in FIG. 3, and the SR flip flop is used to output to the S terminal the abnormal signal lit output from the microcomputer 12b when the microcomputer 11b is abnormal, and output the IGNSW signal or the automatic driving SW signal of the vehicle to the R terminal. When the IGNSW signal or the automatic driving SW signal of the vehicle is output to the R terminal, the disabling of the communication circuit 11c is released.

Also in the second embodiment of the present invention, the similar effect to that of the first embodiment can be obtained.

Third Embodiment

Next, a third embodiment of the present invention will be described.

Figure 5:
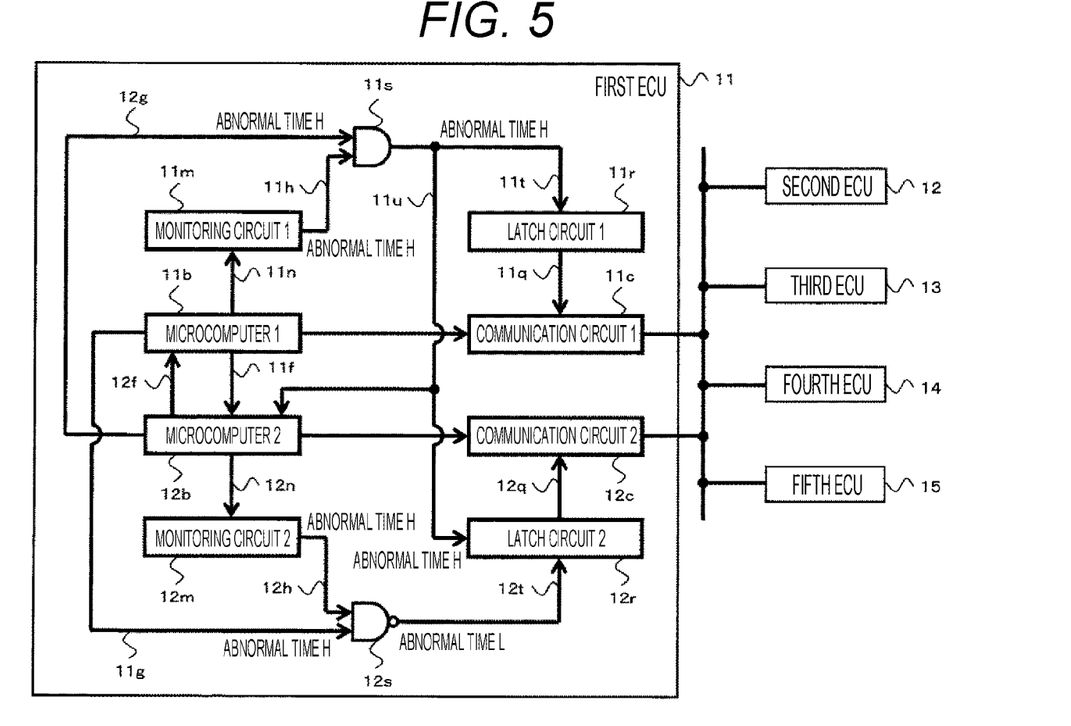
FIG. 5 is a diagram showing an internal configuration of an autonomous running control unit (first ECU) in a third embodiment of the present invention.

The third embodiment of the present invention is an example in which the operation of the first control microcomputer 11b in the vehicle control device 11 is monitored by the monitoring circuit outside the microcomputer 11b and the second control microcomputer 12b, and after abnormality is detected in both circuits, the communication circuit 11c on the side of the first control microcomputer 11b is latched in a disabled state.

FIG. 5 is a diagram showing an internal configuration of an autonomous running control unit (first ECU) 11 in the third embodiment of the present invention.

As similar to FIG. 4, although the microcomputer 10b and the outside sensor are not shown in FIG. 5, the microcomputer 10b and the outside sensor are also disposed and connected as in FIG. 2, and the microcomputer 10b transmits the track information generated on the basis of the information from the outside sensor to the microcomputer 11b and the microcomputer 12b.

The microcomputer 11b generates an actuator control command on the basis of the track information from the microcomputer 10b, and transmits the actuator control command to the brake control unit 13, the engine control unit 14, and the power steering control unit 15, and also transmits the actuator control command to the microcomputer 12b via a communication line 11f to determine the normality of the microcomputer 11b.

Similarly, the microcomputer 12b generates an actuator control command on the basis of the track information from the microcomputer 10b. However, the microcomputer 12b compares the actuator command generated by the microcomputer 12b with the actuator control command received from the microcomputer 11b to determine whether it is an abnormality of the microcomputer 11b, and when detecting an abnormality of the microcomputer 11b, the microcomputer 12b outputs an abnormal signal 12g.

On the other hand, a monitoring circuit 11m that monitors the microcomputer 11b is connected to the microcomputer 11b, and the monitoring circuit 11m has a monitoring circuit for a supply voltage of the microcomputer 11b and a watchdog timer that monitors runaway of the microcomputer.

Here, the monitoring circuit for monitoring the microcomputer 11b may be a circuit incorporated in the microcomputer 11b.

When the monitoring circuit 11m detects an abnormality of the microcomputer 11b, the monitoring circuit 11m outputs an abnormal signal 11h. The abnormal signal 12g and the abnormal signal 11h are connected to the input terminal of the AND gate 11s, and the latch circuit 11r is set so that when an abnormality is detected in both the microcomputer 12b and the monitoring circuit 11m, the output signal lit from the AND gate 11s becomes High and the communication circuit 11c is latched in a disabled state.

This is to prevent the communication circuit 11c from stopping even in the case of an abnormality of the monitor side circuit 11m or overdetecting of the monitor side circuit 11m when monitoring is performed by the microcomputer 12b alone or the monitoring circuit 11m alone. The output terminal of the AND gate 11s is also connected to the latch circuit 12r, and the output signal 11u is transmitted from the AND gate 11s to the latch circuit 12r.

Note that there are abnormalities in the microcomputers such as hardware abnormalities, software abnormalities, and intentional unauthorized accesses, and a configuration is desirable in which such abnormalities can be detected appropriately, but this is not a limitation.

Figure 6:
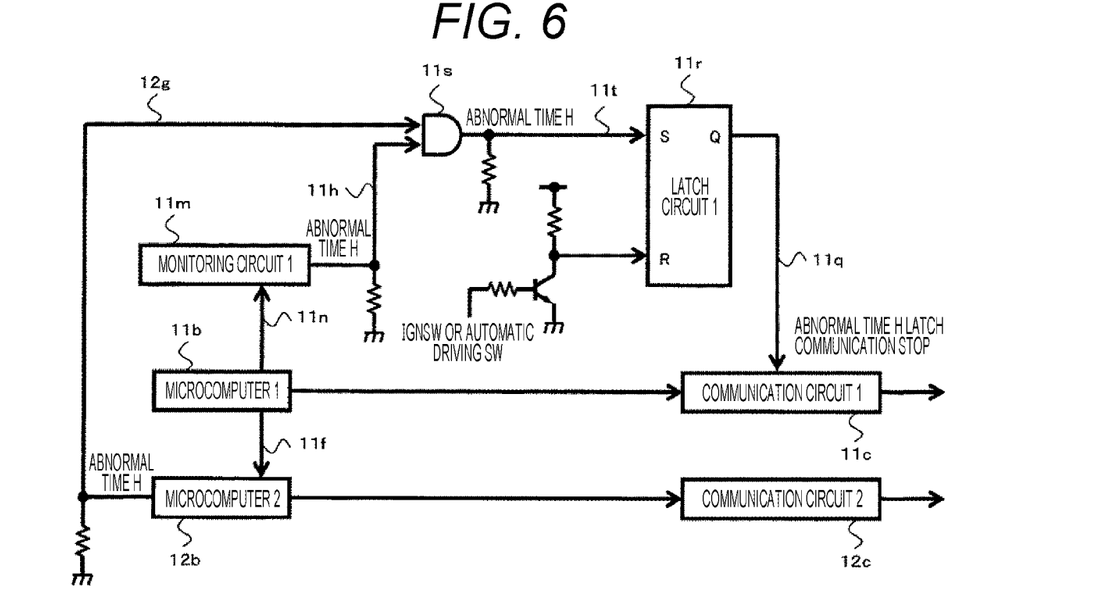
FIG. 6 is a diagram showing details of a latch circuit (latch circuit 1) in the third embodiment of the present invention.

FIG. 6 is a diagram showing details of the latch circuit (latch circuit 1) 11r in the third embodiment of the present invention. Furthermore, FIG. 7 is a table showing the state relationship between the latch circuit 11r and the communication circuit 11c in the third embodiment of the present invention.

Figure 7:
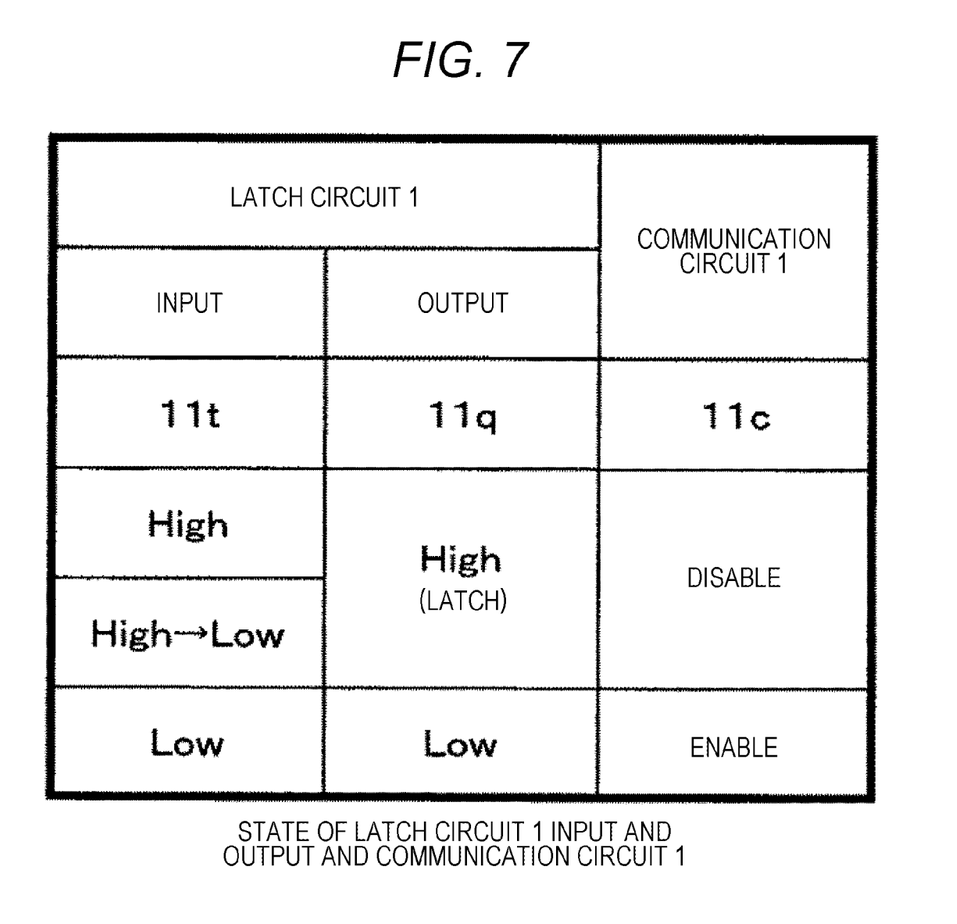
FIG. 7 is a table showing the state relationship between the latch circuit and a communication circuit in the third embodiment of the present invention.

In FIGS. 6 and 7, the output lit of the AND gate 11s that inputs abnormal signals of the microcomputer 12b and the monitoring circuit 11m has a pull-down resistor mounted between the output end of the AND gate 11s and GND, so that immediately after system startup, the output lit of the AND gate 11s is low, and the communication circuit 11c is in the enabled state.

When both the microcomputer 12b and the monitoring circuit 11m detect an abnormality of the microcomputer 11b, the output lit of the AND gate 11s becomes High, and the communication circuit 11c transitions to the disabled state by the signal 11q from the latch circuit 11r. The disable mentioned here may be setting of stopping the function of the communication circuit 11c, but may be a setting of making the function dedicated only for receiving (only the transmission of the communication circuit 11c is stopped) in consideration of the interference to the communication bus connected.

On the other hand, in the third embodiment, as shown in FIG. 5, a monitoring circuit 12m (second monitoring circuit) having a watchdog timer similar to the monitoring circuit 11m (first monitoring circuit) is also set on the microcomputer 12b side.

This is to monitor the normality of the microcomputer 12b from the viewpoint of safety, considering that the microcomputer 11b becomes abnormal and the control shifts from the microcomputer 11b to the microcomputer 12b, and a program run signal from the microcomputer 12b is output to the monitoring circuit 12m.

When the monitoring circuit 12m detects an abnormality of the microcomputer 12b, an abnormal signal 12h is output.

The microcomputer 12b generates an actuator control command on the basis of the track information from the microcomputer 10b, and transmits the actuator control command also to the microcomputer 11b via a communication line 12f to determine the normality of the microcomputer 12b.

Similarly, the microcomputer 11b generates an actuator control command on the basis of the track information from the microcomputer 10b. However, the microcomputer 11b compares the actuator command generated by the microcomputer 11b with the actuator control command received from the microcomputer 12b to detect an abnormality of the microcomputer 12b, and when detecting an abnormality of the microcomputer 12b, the microcomputer 11b outputs an abnormal signal 11g.

The abnormal signal 12h and the abnormal signal 11g are connected to the input end of the NAND gate 12s, and the output end of the NAND circuit 12s is connected to the latch circuit 12r (second latch circuit). The latch circuit 12r is set so that, when both the microcomputer 11b and the monitoring circuit 12m detect an abnormality, the output signal of the NAND circuit 12s becomes Low, and the communication circuit 12c is latched in a disabled state by the output signal 12q of the latch circuit 12r.

Figure 8:
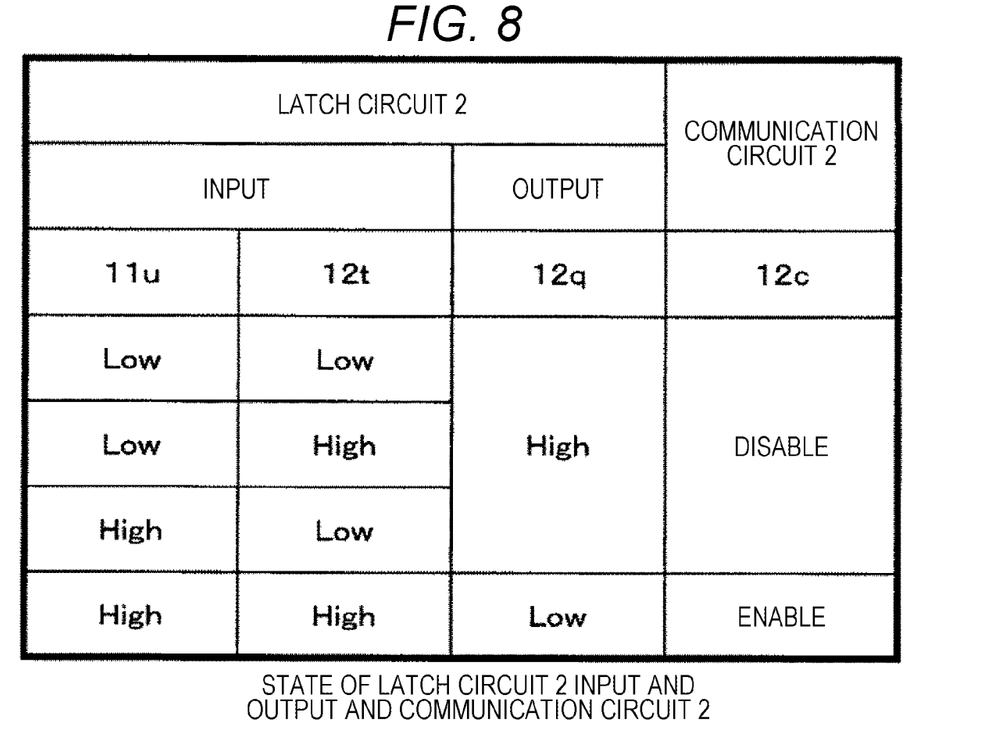
FIG. 8 is a table showing the state relationship between input and output of the latch circuit and a communication circuit in the third embodiment of the present invention.

FIG. 8 is a table showing the state relationship between input and output of the latch circuit 12r and the communication circuit 12c in the third embodiment of the present invention. Immediately after startup of the automatic driving system, the inputs 11u and 12t of the latch circuit 12r are Low, and the communication circuit 11c is enabled and the communication circuit 12c is disabled.

Figure 9:
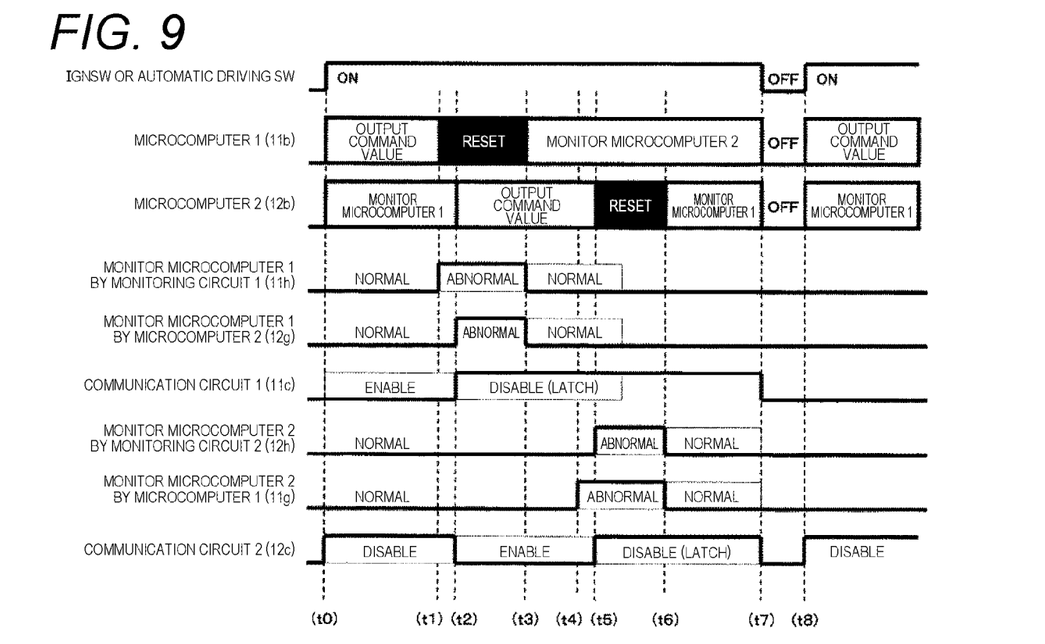
FIG. 9 is a timing chart showing a state of each circuit block and each signal in the third embodiment of the present invention.

FIG. 9 is a timing chart showing a state of each circuit block and each signal in the third embodiment of the present invention.

In FIG. 9, when the IGNSW or the automatic driving SW is turned on at time t0, the track information is input to the microcomputer 11b and the microcomputer 12b on the basis of the information of the outside sensor, and both microcomputers generate actuator control commands. Immediately after the IGNSW or the automatic driving SW is turned on (t0), while the communication circuit 11c is in the enabled state, the communication circuit 12c is in the disabled state.

Therefore, the actuator control command of the microcomputer 11b is sent out via the communication circuit 11c.

On the other hand, the actuator control command of the microcomputer 12b is cut off by the communication circuit 12c.

Furthermore, the microcomputer 12b compares the actuator control command generated by the microcomputer 11b and the actuator control command generated by the microcomputer 12b to monitor the microcomputer 11b. On the other hand, the microcomputer 11b also compares the actuator control command generated by the microcomputer 12b and the actuator command generated by the microcomputer 11b to monitor the microcomputer 12b.

Here, when an abnormality is detected in monitoring of the microcomputer 11b by the monitoring circuit 11m and a reset occurs (time t1), the actuator control command of the microcomputer 11b is not transmitted to the microcomputer 12b, an abnormality is detected also in the comparison of the actuator control command by the microcomputer 12b, the signal 12g indicates the abnormality, and the communication circuit 11c is in a disabled state (at time t2).

Since the signal 11u is High and the signal 12t is High at the same time (time t2), the communication circuit 12c is enabled by the signal 12q, and the actuator control command of the microcomputer 12b is sent to the brake control unit 13 or the like via the communication circuit 12c.

Before occurrence of abnormality of the microcomputer 1 (before reset of the microcomputer 11b), the actuator control commands of the microcomputer 11b and the microcomputer 12b are compared with each other for checking there is no abnormality, so that the actuator control command with respect to the brake control 13 or the like can reduce the control gap even when shifting to the microcomputer 12b.

When the microcomputer 11b is recovered from the reset (time t3), that is, when it is recovered from the abnormality to normal, even when the abnormality flags (abnormal signals) 11h and 12g by the monitoring circuit 11m and the microcomputer 12b become low (normal), since there is no change in the state of the IGSW and the automatic driving SW, the output 11q of the latch circuit 11r holds the High output. Therefore, the communication circuit 11c continues to be disabled.

Therefore, even when the microcomputer 11b is recovered from an abnormality, the actuator control command generated by the microcomputer 11b is cut off by the communication circuit 11c.

However, since comparison monitoring of the actuator control command with the microcomputer 12b by the microcomputer 11b is continuously performed, the microcomputer 11b substantially becomes a monitoring microcomputer of the microcomputer 12b.

That is, the microcomputer 11b, which is the first control command generation unit, monitors the actuator control command generated by the microcomputer 12b, which is the second control command generation unit, and detects whether an abnormality has occurred in the second control command generation unit on the basis of this actuator control command.

Thereafter, when the abnormality is detected from the comparison result of the actuator control command of the microcomputer 12b by the microcomputer 11b (time t4) and the abnormality is also detected in the monitoring circuit 12m (time t5), the signal 12t becomes Low and the communication circuit 12c is also disabled by the signal 12q output from the latch circuit 12r. This is because the communication circuits 11c and 12c remain disabled even after the signals 12h and 11g become normal at time t6.

Therefore, in addition to the cutting off of the actuator control command of the microcomputer 11b, the actuator control command of the microcomputer 12b is also cut off. In this case, the auxiliary control device (ECU 12 (auxiliary control unit)) is notified of the communication state of the communication circuits 11c, 12c of the ECU 11, thereby monitoring that an abnormality is detected in the microcomputer 11b and the microcomputer 12b, and shifting to appropriate degeneration control.

When the IGNSW or the automatic driving SW turns from off (time t7) to on (time t8), the vehicle control resumes from the same control as the initial (time t0).

Also in the third embodiment of the present invention, the similar effect to that of the first embodiment can be obtained, and in addition, the effect as follows can be obtained.

That is, in the third embodiment of the present invention, whether an abnormality occurs in the microcomputer 11b is monitored by both the monitoring circuit 11m and the microcomputer 12n, and when both have determined that an abnormality occurs in the microcomputer 11b, the communication circuit 11c is disabled, so that it is possible to prevent the communication circuit 11c from being disabled due to abnormality or excess detection of the monitoring circuit 11m.

Similarly, whether an abnormality occurs in the microcomputer 12b is monitored by both the monitoring circuit 12m and the microcomputer 11b, and when both have determined that an abnormality occurs in the microcomputer 12b, the communication circuit 12c is disabled, so that it is possible to prevent the communication circuit 12c from being disabled due to abnormality or excess detection of the monitoring circuit 12m.

Furthermore, after an abnormality occurs in the microcomputer 11b, automatic driving control is performed by the microcomputer 12b according to the actuator control command, and thereafter, when abnormality is detected in the microcomputer 12b, the communication circuit 12c is disabled and the shift to degeneration control is performed by the auxiliary control device 12 (second ECU), so that safety can be further improved.

Furthermore, in the third embodiment of the present invention, the functions of the microcomputer 11b and the microcomputer 12b generate an actuator control command on the basis of the track information from the microcomputer 10b and compare the actuator control command with each other, so that the control software to be installed in the microcomputer 11b and the microcomputer 12b can be standardized as the same content.

Therefore, not only the control gap at the time of the actuator control command shift from the microcomputer 11b to the microcomputer 12b is reduced, but also the number of man-hours for developing the control software can be reduced.

Note that, in the first, second, and third embodiments described above, the communication circuit for transmitting the actuator control command from the microcomputer 11b and the microcomputer 12b are two of the communication circuit 11c of the microcomputer 11b and the communication circuit 12c of the microcomputer 12b. However, the present invention can be also configured so that one communication circuit is adopted commonly for the microcomputer 11*b* and the microcomputer 12*b*, the communication circuit switches between inputting the actuator control command from the microcomputer 11*b*, inputting the actuator control command from the microcomputer 12*b*, or inputting none of the actuator control commands of the microcomputer 11*b* and the microcomputer 12*b*, and either state can be latched.

REFERENCE SIGNS LIST 1 camera
2 radar
3 host vehicle position sensor
4 automatic driving setting unit
11 autonomous running control unit
11*b*, 12*b* control microcomputer (operation processing unit)
11*c*, 12*c* communication circuit
11*m*, 12*m* monitoring circuit
11*r*, 12*r* latch circuit
11*s* AND circuit
12*s* NAND circuit
12 auxiliary control unit
13 brake control unit
14 engine control unit
15 power steering control unit

The invention claimed is:

1. A vehicle control device comprising:
a first control command generation unit that generates an actuator control command to be transmitted to an actuator control unit of a vehicle;
a second control command generation unit that generates an actuator control command to be transmitted to the actuator control unit;
a communication circuit for transmitting the actuator control command generated by the first control command generation unit and the actuator control command generated by the second control command generation unit to the actuator control unit; and
a first monitoring circuit that detects that an abnormality has occurred in the first control command generation unit,
wherein the second control command generation unit compares the actuator control command generated by the second control command generation unit with the actuator control command generated by the first control command generation unit to detect whether an abnormality has occurred in the first control command generation unit, and when the first monitoring circuit detects that an abnormality has occurred in the first control command generation unit, and the second control command generation unit detects that an abnormality has occurred in the first control command generation unit, the communication circuit is latched in a disabled state so as to cut off transmission of the actuator control command generated by the first control command generation unit to the actuator control unit.

2. The vehicle control device according to claim 1, further comprising:
a first latch circuit that, when the first monitoring circuit detects that an abnormality has occurred in the first control command generation unit, latches the communication circuit in the disabled state so as to cut off transmission of the actuator control command generated by the first control command generation unit to the actuator control unit.

3. The vehicle control device according to claim 1, further comprising
a first latch circuit that latches the communication circuit in the disabled state so as to cut off transmission of the actuator control command generated by the first control command generation unit to the actuator control unit,
wherein the second control command generation unit detects that an abnormality has occurred in the first control command generation unit, and outputs an abnormal signal to the first latch circuit, and the communication circuit is latched in the disabled state by the first latch circuit.

4. The vehicle control device according to claim 3,
wherein the second control command generation unit compares the actuator control command generated by the second control command generation unit with the actuator control command generated by the first control command generation unit to detect whether an abnormality has occurred in the first control command generation unit.

5. The vehicle control device according to claim 1,
wherein when an abnormality occurs in the first control command generation unit, the actuator control command generated by the second control command generation unit is transmitted to the actuator control unit through the communication circuit.

6. The vehicle control device according to claim 5,
wherein when the first control command generation unit recovers to normal from an abnormality, the first control command generation unit detects whether an abnormality has occurred in the second control command generation unit on the basis of the actuator control command generated by the second control command generation unit.

7. The vehicle control device according to claim 1,
further comprising a first latch circuit that latches the communication circuit in the disabled state so as to cut off transmission of the actuator control command generated by the first control command generation unit to the actuator control unit, wherein when an ignition switch signal or an automatic driving switch signal of the vehicle is input to the first latch circuit, latching in the disabled state of the communication circuit is released.

8. The vehicle control device according to claim 1,
further comprising an auxiliary control unit that generates an actuator control command to be transmitted to the actuator control unit of the vehicle, wherein the auxiliary control unit is notified that an abnormality has occurred in the first control command generation unit and the second control command generation unit.

9. The vehicle control device according to claim 1,
wherein the first control command generation unit and the second control command generation unit are supplied with power from separate power supplies, respectively.

10. The vehicle control device according to claim 1,
wherein the communication circuit comprises:
a first communication circuit for transmitting the actuator control command generated by the first control command generation unit to the actuator control unit; and a second communication circuit for transmitting the actuator control command generated by the second control command generation unit to the actuator control unit.

11. The vehicle control device according to claim 1,
wherein, in the communication circuit, control software installed in the first control command generation unit and control software installed in the second control command generation unit have the same content.

12. A vehicle control system comprising:
an outside recognition sensor that recognizes the outside of a vehicle;
an automatic driving setting unit that sets automatic driving of the vehicle;
an actuator control unit that controls operation of the vehicle; and
a vehicle control device that generates an actuator control command for commanding the operation of the vehicle on the basis of outside recognition information from the outside recognition sensor and track information generated by a track information generation unit, and transmits the actuator control command to the actuator control unit,
wherein the vehicle control device comprises a first control command generation unit that generates an actuator control command to be transmitted to the actuator control unit, a second control command generation unit that generates an actuator control command to be transmitted to the actuator control unit, a communication circuit for transmitting the actuator control command generated by the first control command generation unit and the actuator control command generated by the second control command generation unit to the actuator control unit, and a first monitoring circuit that detects that an abnormality has occurred in the first control command generation unit, wherein the second control command generation unit compares the actuator control command generated by the second control command generation unit with the actuator control command generated by the first control command generation unit to detect whether an abnormality has occurred in the first control command generation unit, and when the first monitoring circuit detects that an abnormality has occurred in the first control command generation unit, and the second control command generation unit detects that an abnormality has occurred in the first control command generation unit, the communication circuit is latched in a disabled state so as to cut off transmission of the actuator control command generated by the first control command generation unit to the actuator control unit.

13. The vehicle control system according to claim 12,
wherein the vehicle control device comprises: a first latch circuit that, when the first monitoring circuit detects that an abnormality has occurred in the first control command generation unit, latches the communication circuit in the disabled state so as to cut off transmission of the actuator control command generated by the first control command generation unit to the actuator control unit.

14. The vehicle control system according to claim 12,
wherein the vehicle control device comprises a first latch circuit that latches the communication circuit in the disabled state so as to cut off transmission of the actuator control command generated by the first control command generation unit to the actuator control unit, and the second control command generation unit detects that an abnormality has occurred in the first control command generation unit, and outputs an abnormal signal to the first latch circuit, and the communication circuit is latched in a disabled state by the first latch circuit.

15. The vehicle control system according to claim 14,
wherein when the first control command generation unit recovers to normal from an abnormality, the first control command generation unit detects whether an abnormality has occurred in the second control command generation unit on the basis of the actuator control command generated by the second control command generation unit.

* * * * *